Feb. 28, 1961 C. G. SONTHEIMER 2,973,431
AUTOMOBILE RADIO RECEIVER SYSTEM
Filed July 22, 1954 3 Sheets-Sheet 1
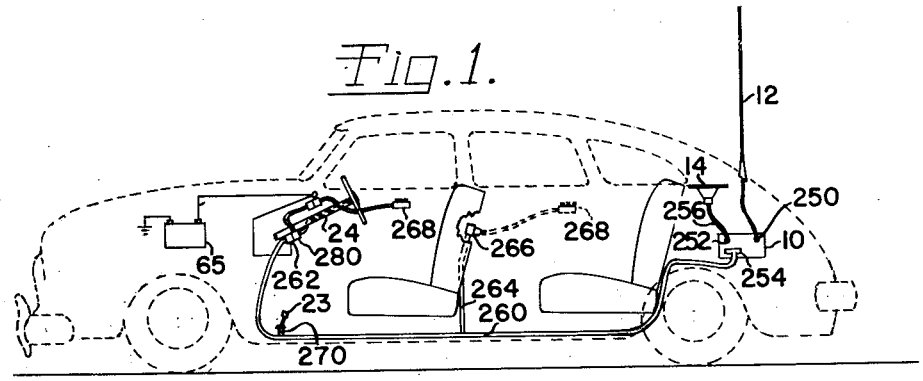
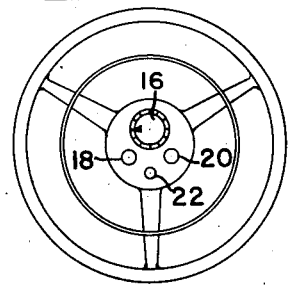
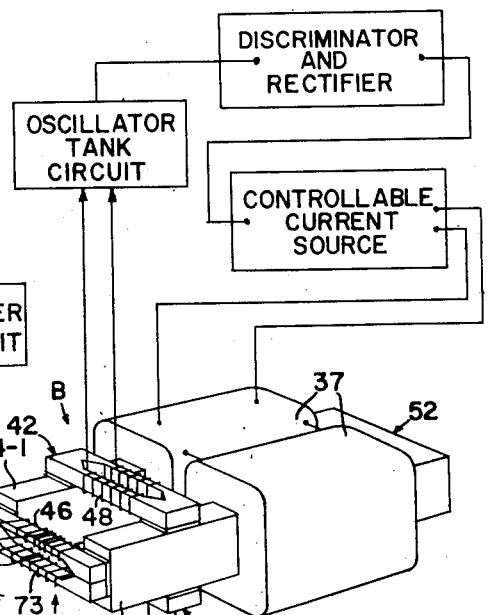
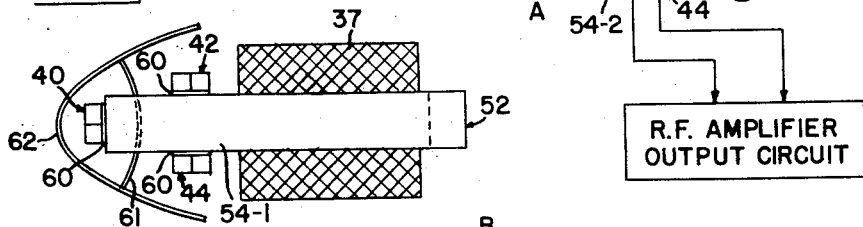
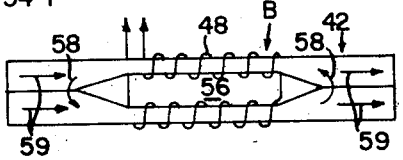
INVENTOR
CARL G. SONTHEIMER
BY
Curtis, Morris & Safford
ATTORNEYS

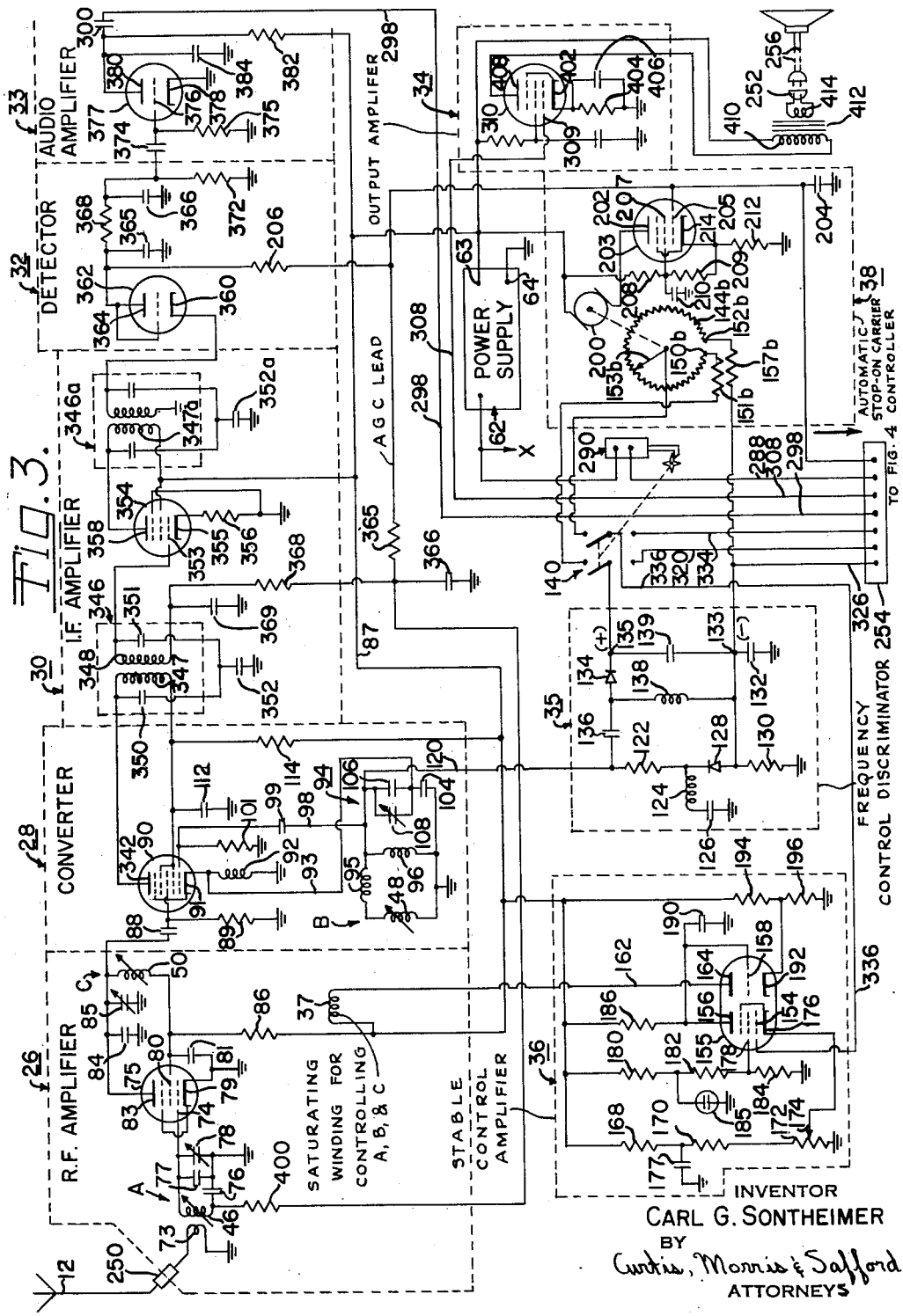

Feb. 28, 1961     C. G. SONTHEIMER     2,973,431
AUTOMOBILE RADIO RECEIVER SYSTEM
Filed July 22, 1954     3 Sheets-Sheet 3
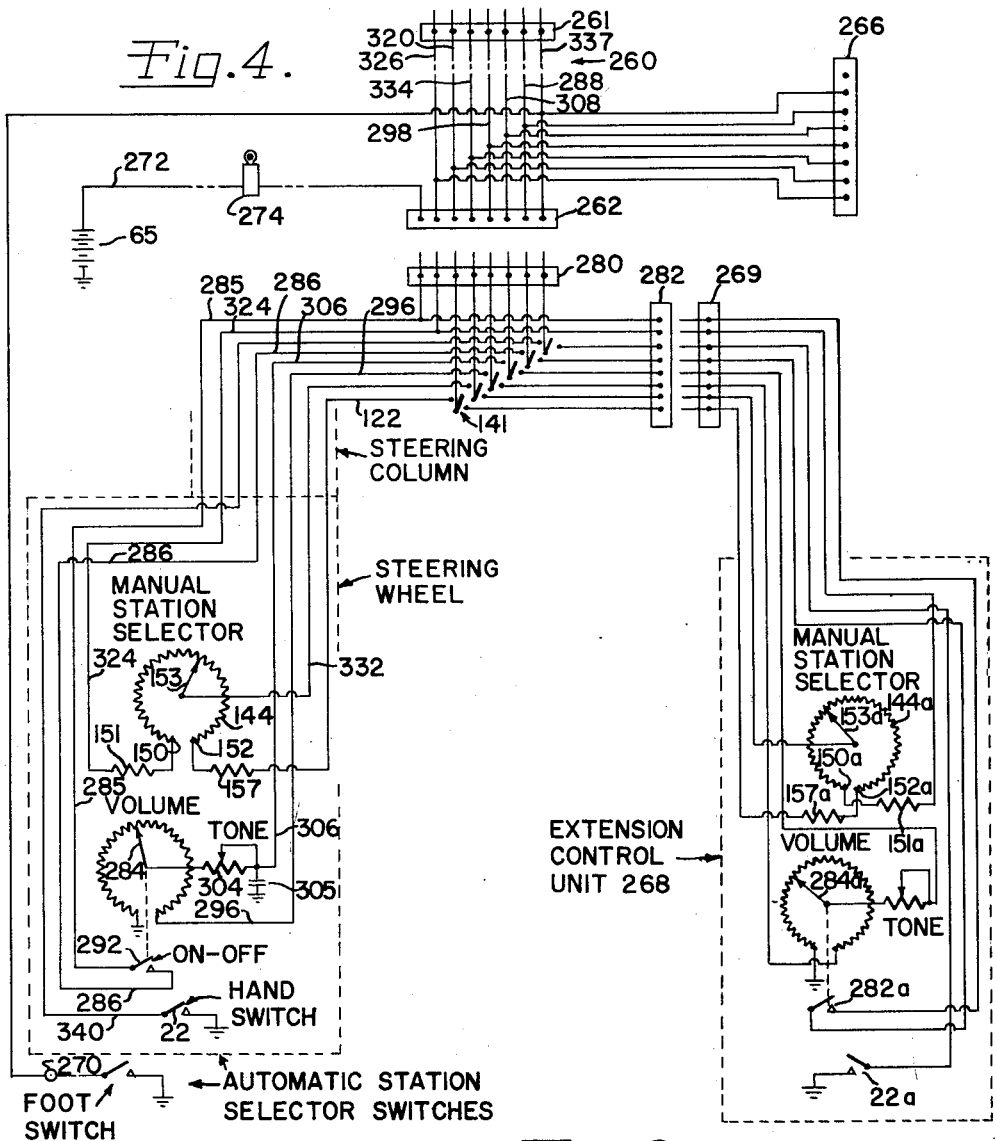
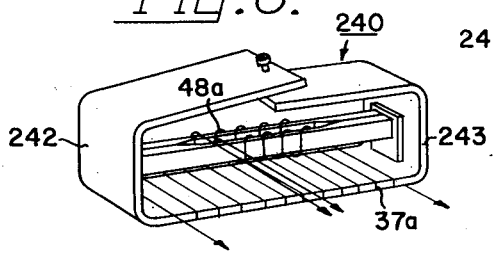
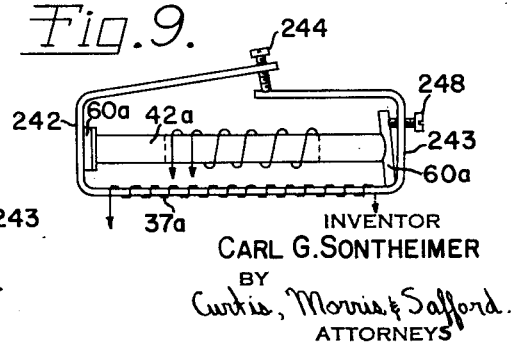
INVENTOR
CARL G. SONTHEIMER
BY
Curtis, Morris & Safford.
ATTORNEYS

United States Patent Office 2,973,431
Patented Feb. 28, 1961

2,973,431

AUTOMOBILE RADIO RECEIVER SYSTEM

Carl G. Sontheimer, Riverside, Conn., assignor to C.G.S. Laboratories, Inc., Stamford, Conn., a corporation of Connecticut Filed July 22, 1954, Ser. No. 445,146

10 Claims. (Cl. 250—20)

The present invention relates to automobile radio receivers and particularly to automobile radio receivers capable of being operated by controls positioned at a distance from the receiver chassis.

In present day automobiles the radio receivers are mounted behind the instrument panel so that the controls, which are incorporated in the same chassis with the remainder of the radio components, are within reach of the driver's position. This arrangement has a number of disadvantages. For example, the radio is difficult to remove and replace because of the other parts of the automobile which are crowded into the space behind the instrument panel, such as the ventilating controls, portions of the heating system, etc. Moreover, in the design of automobiles, the space behind the instrument panel is limited and the removal of the automobile radio from this location would permit other equipment to be placed behind the instrument panel or would permit the instrument panel to be redesigned to provide additional room within the body of the automobile. In addition, the radio controls ordinarily are at a substantial distance from the steering wheel of a car, so that the driver must necessarily move one hand a considerable distance from the steering wheel in order to adjust or tune the radio receiver.

At various times tuning elements have been provided that are remotely positioned from the chassis of the radio receiver and connected to it by flexible shafts, so that the operating controls could be located nearer the steering wheel and the mechanical movement of the controls coupled through these exible shafts to the movable components within the radio receiver. The disadvantages of such mechanical arrangements are well known and have for the most part been abandoned in favor of a unitary chassis construction.

The present invention provides an automobile radio receiver located remotely from the driver's position and which can be tuned and adjusted by the driver without the necessity of any mechanically movable parts in the radio receiver. For example, the radio receiver can be installed in the trunk of the car and connected by wires to a small control panel positioned near the driver's seat. For example, the control unit is sufficiently small that it can be mounted directly on the steering post, in the center of the steering wheel, or part of the controls can be mounted in the central position and the tuning control mounted on one of the spokes of the steering wheel so that stations can be selected by the driver without removing his hand from the steering wheel or by moving it only a short distance from the steering wheel.

The advantage of such arrangements will be obvious both from the standpoint of convenience and utility as well as from the standpoint of ease of service and maintenance.

Other aspects and advantages of the present invention will be apparent from the following description of an automobile radio incorporating the invention considered in conjunction with the accompanying drawings, in which:

Figure 1 is a diagrammatic view of an automobile showing the arrangement of a radio receiver embodying the present invention;

Figure 2 is an enlarged front view of the steering wheel showing the controls for the radio mounted in the center of the steering wheel;

Fig. 3 is a schematic circuit diagram of the radio receiver and control circuits of an automobile radio incorporating the invention;

Figure 4 is a schematic circuit diagram of the wiring and connections for the remote control of the receiver of Figure 3;

Figure 5 shows, partly diagrammatically and partly in perspective, an electrically-controllable inductor which forms part of the auto radio receiver shown in Figure 3, the shielding structure being omitted to show the construction;

Figure 6 is an elevational view of the inductor of Fig. 5, the control winding being shown diagrammatically and in section;

Figure 7 is an enlarged view of one of the three variable-inductance signal circuits of the inductor of Figure 5;

Figure 8 is a perspective view of another embodiment of the inductor of Figure 5, the control winding being indicated diagrammatically; and Figure 9 is an elevational view of the inductor of Figure 8.

The automobile radio receiver shown in the drawings is divided into a number of separate components with plugs and sockets at convenient points in the system. The receiver chassis 10, which is located in a convenient place in the automobile, for example in the rear trunk as shown in Figure 1, includes all of the circuit elements shown in Figure 3 except the antenna 12 and the loudspeaker 14.

As shown in Figure 2, controls for the radio are positioned on the hub of the steering wheel. These include a manual station selector 16, which may be adjusted by the driver to tune the receiver to various stations, a combined on-off switch and volume control 18, a tone control 20, and an automatic station selector push-button switch 22. Momentary closure of switch 22 causes the receiver to tune itself to a radio station on an adjacent frequency. A foot switch 23 near the driver's position controls the receiver in the same manner as the switch 22. The connections from the controls on the steering wheel extend down inside of the steering column 24.

In the receiver chassis 10 is a radio frequency amplifier stage 26 (Figure 3), an oscillator and frequency converter stage 28, a tuned intermediate frequency amplifier 30, an audio frequency detector stage 32, a first audio amplifier stage 33 and an audio power amplifier stage 34. A frequency control network 35 is provided to stabilize the oscillator and is connected to a control amplifier 36 to tune automatically the radio-frequency circuits by regulating the control current through a winding 37, as explained in detail hereinafter. An automatic carrier-seeking control 38 is provided so that whenever the control button 22 or 23 is depressed the receiver will automatically tune to another station.

In order remotely to control receiver 10, an electrically-controllable inductor is provided having three radio-frequency control circuits A, B, and C, with the control winding 37 associated therewith for regulating their inductances in accordance with the position of the station selector 16.

In one embodiment of the present invention, the controllable inductor circuits A, B, and C (see also Figures 5, 6, and 7) include ferrite core portions 40, 42, and 44 respectively, with signal windings 46, 48 and 50 wound thereon. The core portions 40, 42, and 44 are bridged across between the legs of a U-shaped magnetic control core portion 52 having the control winding 37 in two series connected portions and one portion being around each of the two legs 54–1 and 54–2 of the control yoke.

The control winding portions are connected in flux aiding relationship on the control yoke 52 so that any control current flowing through winding 37 regulates the degree of magnetic saturation of signal core portions 40, 42, and 44.

As shown in detail in Figure 7, each of the signal core portions, for example the core portion 42, comprises two elongated bars of ferrite or ferromagnetic ceramic placed longitudinally adjacent one another. This ferrite material may be similar to that disclosed by Snoek in U.S. Patents Nos. 2,452,529; 2,452,530; and 2,452,531. A generally elongated hexagonal signal winding opening 56 is formed by trapezoidal recesses in the adjoining sides of the two bars. The signal winding 48 associated with core 42 is in two halves extending through the opening 56 and connected in series, so that their magnetic fields are in aiding relationship around the opening 56 to induce flux flowing around opening 56, as indicated by arrows 58. Whereas, the control flux, in flowing between the legs 54–1 and 54–2, follows paths extending substantially the full length of the core 42 as indicated by the arrows 59 so that the control and signal flux fields are not mutually coupled. The signal flux 58 is alternating in direction, while the control flux 59 may be a generally unidirectional flux whose value is varied only as necessary to regulate the degree of magnetic saturation of the core 42 and particularly the saturation of the edges of core 42 adjacent the hole 56 on which the two halves of winding 48 are wound. The permeability of the ferrite material in the core 42 decreases rather strikingly with an increase in the degree of its magnetic saturation produced by the control flux 59, and thus the inductance in the control circuit B is changed in accordance with the control current in winding 37. Similarly, the inductance in control circuits A and C is controlled by the control current in winding 37, because their cores 40 and 44 are bridged across between the yoke legs 54–1 and 54–2 and are subjected to the substantially same degree of saturation as core 42. Thus, the inductance values of windings 46, 48, and 50 "track" each other.

In order to reduce substantially any residual magnetism in control core 52 or in signal cores 40, 42, and 44 when the control current in winding 37 is decreased, it is advantageous to use non-magnetic shims 60 to space the ends of the signal cores slightly from the legs 54–1 and 54–2. Preferably, these shims are of a non-magnetic material which is electrically conductive. These shims provide further magnetic isolation between cores 40, 42, and 44, and legs 54–1 and 54–2. The thickness of the shims 60 is preferably in the range from about .005 to .010 inch to provide the optimum control of the inductance in circuits A, B, and C by the control current.

For best operation the core portion 40 for the input to the R.F. stage 26 is usually placed across the ends of legs 54–1 and 54–2 as isolating it more completely from the oscillator circuit, with the cores 42 and 44 being bridged across the sides of these legs. A shield of electrically-conductive material 61 is fitted between the core 40 and the cores 42 and 44, and an outer parabolic shield 62 is spaced from and curved around the outside of cores 40, 42, and 44. It is soldered to the edges of shield 61 as shown in Figure 6.

The radio-frequency control circuit A is included in the tuned circuit in the input of the radio frequency amplifier stage 26, and control circuit C is included in the tuned circuit in the output of this stage. Control circuit B is in the oscillator tank circuit. The control current in winding 37 regulates the inductance of the circuits A, B, and C and hence controls the frequency to which the receiver 10 is tuned, as explained in detail hereinafter.

The incoming radio signals picked up on the antenna 12 are coupled from a primary winding 73 (see also Figure 5) on the core 40 to the winding 46 forming a secondary winding and into the tuned input circuit connected between the common return ("ground") circuit of the receiver 10 and the grid 74 of a pentode 75. The primary and secondary windings 73 and 46, respectively, on the core 40 form an antenna coupling transformer having certain advantages discussed hereafter. The tuned input circuit is formed by the winding 46 having one end coupled to ground through a condenser 76 and its other end connected to the grid 74, with a fixed condenser 77 in parallel with a padding condenser 78 connected across the winding 46 and the condenser 76.

The pentode 75 has a cathode 79 connected to ground, a screen grid 80 connected through a condenser 81 to ground, a suppressor grid 82 connected to the cathode, with its plate 83 connected to a tuned plate load circuit including a condenser 84 connected to ground and shunted by an adjustable condenser 85. The other end of the inductance winding 50 is coupled to ground through the condenser 81 and is connected through a filter resistor 86 and a lead 87 to a power supply 62 indicated diagrammatically in block form. The power supply 62 is conventional and has a vibrator connected to the automobile battery 65 (Figure 1) and a voltage step-up circuit to supply a suitably filtered direct high voltage between its output terminals 63 and 64.

The amplified R.F. signal is coupled from the plate 83 through a coupling condenser 88 and across a grid resistor 89 to a grid of an oscillator convertor tube 90 whose cathode 91 is coupled to ground through a radio frequency choke 92 and is also connected by a lead 93 to the oscillator tank circuit, generally indicated at 94.

The oscillator tank circuit 94 comprises, generally, a parallel resonant circuit whose inductance is supplied by the winding 48 connected in series with a fixed padding inductance element 95. Another inductance padding element 96 is connected to the common ground circuit of the receiver chassis and across both the windings 48 and 95, with the junction of the windings 95 and 96 being coupled through a lead 98, a coupling condenser 99 and across a grid resistor 101 to a grid of the tube 90. The other side of the parallel resonant tank circuit includes a condenser 104 connected between the common ground and the lead 93 with a condenser 106 in parallel with an adjustable condenser 108 being connected between leads 93 and 98.

The screen grids of the tube 90 are coupled to ground through a condenser 112 and are connected to the power supply 62 through a filter resistor 114.

*Operation of the remote control circuits*

For purposes of explanation, it is assumed that the receiver 10 is a broadcast receiver tunable through a range from 530 to 1650 kilocycles, or in other words, a frequency range of somewhat more than 3 to 1. To tune through this range the inductance values in circuits A and B must change by a ratio of approximately 10 to 1. This is well within the available range of inductance variations obtainable by using apparatus as shown in Figures 5, 6, and 7; this apparatus can readily produce inductance changes of 100 to 1 and often produces inductance changes of 200 to 1 or more in the signal windings 46, 48, and 50.

In the embodiment of the receiver 10 shown, the oscillator converter stage 28 is arranged to oscillate at a frequency 455 kc. above the carrier signal. Thus, in tuning through the broadcast range the oscillator frequency changes from approximately 985 kc. to 2105 kc., or in other words, a range of something more than 2 to 1, requiring an inductance change of about 5 to 1. As mentioned above, both circuits A and B must be varied over an inductance range of approximately 10 to 1. The inductance in circuit B also varies over a range of 10 to 1, but by using the pair of padding inductance windings 95 and 96 in series and parallel therewith, respectively, the total effective change in the inductance of the resonant tank circuit 94 is adjusted to the required range of about 5 to 1. By using the proper values for inductances 95 and 96 the frequency of the oscillator 28 is caused to "track" 455 kc. above the frequency to which the tuned input and output circuits of the R.F. stage 26 are adjusted, as explained hereafter in connection with a detailed example.

The inductance of the circuits A, B, and C is varied and precisely controlled at any desired value, for tuning to various stations, by regulating the control current through the control winding 37 so as to tune the resonant frequency of the R.F. amplifier and the oscillator frequency as mentioned above. Advantageously, in the circuit shown the frequency of the oscillator is controlled by circuit B and this frequency is monitored by circuits including the discriminating and rectifying circuit 35 associated with the control amplifier 36. The inductance of circuits A and C are forced to follow or "track" with the value of circuit B, which is sensed and controlled as desired, and thus circuit B acts as the "bell wether" for the station selecting circuits as a whole.

The oscillator signal appearing across the oscillator tank circuit 94 is fed through a lead 120 to the top of a series discriminator circuit formed by a resistor 122 in series with an inductor 124, and a grounded condenser 126. The inductor 124 and the condenser 126 are tuned to have a series resonant frequency somewhat above the mavimum oscillator frequency. In the particular circuit shown, with a maximum oscillator frequency of about 2105 kc., this discriminator circuit may be tuned about 50 or 100 kc. higher, for example, may be tuned to 2150 kc. Thus, the discriminator including elements 122, 124, 126 has a negative output slope, for as the oscillator frequency increases, the impedance of the discriminator decreases. Consequently, the magnitude of the rectified signal, which is fed from the junction of the resistor 122 and the inductor 124 is decreased. This output is fed through a rectifier 128 and appears across a resistor 130 in parallel with a condenser 132, connected between ground and output terminal 133 of network 38. Since the rectifier 128 is arranged to pass only the negative half cycles of the output from the discriminator, the potential of the terminal 133 is always negative with respect to the common ground circuit. The terminal 133 has its greatest negative voltage when the oscillator is at its minimum frequency, this voltage being equal to the amplitude "A" of the oscillations in the tank circuit 94 times $\sqrt{2}$, and as the oscillator frequency increases, the terminal 133 becomes less negative, approaching nearly zero when the oscillator is at its maximum frequency.

A rectifier 134 is coupled to the lead 120 through a high pass filter including a condenser 136 between the lead 120 and the rectifier 134 and an inductor 138 between the terminal 133 and the rectifier 134. The high pass filter is arranged to have a cut-off frequency far below the minimum oscillator frequency. Thus, regardless of the oscillator frequency, the full amplitude "A" of the oscillations in the tank circuit 94 is fed to the rectifier 134, which is arranged to pass only positive half cycles. Thus, a positive voltage is fed to an output terminal 135 of the circuit 38. This positive voltage appears across a condenser 139 and is always equal in magnitude to $A\sqrt{2}$, so that the terminal 135 is always $A\sqrt{2}$ volts above the terminal 133.

In summary of the operation of the discriminator and rectifier circuit 38, the terminal 133 is at a large negative voltage when the oscillator is at minimum frequency, and this terminal 133 gradually moves up and almost reaches zero voltage when the oscillator is at maximum frequency. The terminal 135 is always $A\sqrt{2}$ volts above terminal 133. Thus, terminal 135 is at a small positive voltage when the oscillator is at minimum frequency and gradually moves up to a large positive voltage when the oscillator is at maximum frequency.

As will be explained in connection with the description of the remote control circuits, depending upon the positions of a switch 140 (Figure 3) and a switch 141 (Figure 4), one of three circular potentiometers 144, 144a, or 144b (Figure 3) is connected by suitable wiring between the terminals 133 and 135. Assuming that the potentiometer 144 controlled by the manual station selector 16 on the steering wheel is connected across terminals 133 and 135, then some point along potentiometer 144 is at zero or "ground" potential because terminal 133 is always below and terminal 135 is always above zero. The position of this zero point depends upon the oscillator frequency at that time. When the oscillator is at minimum frequency, the zero voltage point on potentiometer 144 is near its right terminal 152. As the oscillator frequency increases, this zero voltage point shifts along potentiometer 144 toward its left terminal 150. The potentiometer 144 is in series between resistors 151 and 157 so that every point along the potentiometer 144 will adjust to zero voltage, thus providing a range of adjustment corresponding with full scale width of the knob 16.

An important advantage of the present invention is that the position of this zero voltage point depends upon the relative voltages between terminals 133 and 135 and ground, both of which voltages are proportionately affected by any changes in oscillator amplitude "A." Thus, the position of the zero voltage point on potentiometer 144 is independent of the oscillator amplitude and depends only upon the oscillator frequency. A given point on potentiometer 144 always corresponds with the same oscillator frequency and similarly with potentiometers 144a and 144b when they are being used to control the receiver.

The manual control 16 is used to move an adjustable contact 153 along the potentiometer 144. If the adjustable contact 153 is at a position along potentiometer 144 which differs from the zero voltage point, this difference or "error" voltage is fed to the grid 154 (Figure 3) of a pentode 155 in the D.C. control amplifier circuit 36. The output from the plate 156 of the pentode 155 is direct coupled to the grid 158 of a triode to control the current flow through the control winding 37, which is connected by a lead 162 between the plate 164, of the triode 160 and the power supply 62.

To compensate for fluctuations in the voltage from the power supply 62 or from the automobile battery 65 due to changes in load which might affect the temperature of the cathode 166 of pentode 155, a voltage-dropping network is provided, including two fixed resistors 168 and 170, and a potentiometer 172. The potentiometer 172 is used to adjust the mid-point of the operating range of the controllable inductor. The adjustable contact 174 of potentiometer 172 is connected to the cathode 176 and is moved to a position along the potentiometer 172 giving the best compensation and the best operating range. With the tube used in the embodiment described, the contact 174 should be adjusted to bias the cathode about 1.0 volt positive with respect to the common "ground" when the battery 65 is supplying normal voltage. This 1.0 volt adjustment is such that with zero voltage applied to the grid 154, the current through the control winding 37 tunes the receiver to the middle of the broadcast frequency band. Moreover, the 1.0 volt bias adjustment gives excellent compensation over a full 10% fluctuation in battery voltage, for as the batatery voltage drops, lowering the temperature and hence the work function of the cathode 176, the voltage from the power supply terminal 63 also drops so that the cathode bias is correspondingly reduced to compensate for the work function reduction.

Moreover, due to its own heat storage capacity, the temperature of the cathode 176 tends to lag behind rapid changes in the battery voltage. In order to delay the changes in the bias of the cathode 176 so that any fluctuations in bias will occur at the same rate as any changes in cathode temperature, a large electrolytic condenser 177 is connected to ground from the junction of the resistors 168 and 170 so that the time-constant formed by the resistor 168 and the condenser 177 is effectively equal to the thermal time lag of the cathode 176.

In case the particular pentode 155 being used is sensitive to voltage fluctuations of its screen 178, this screen is connected to another voltage-dropping network including three resistors 180, 182, and 184 in series between the power supply terminal 63 and the common ground circuit. To isolate the screen from any voltage fluctuations in the power lead 87 the junction of resistors 180 and 182 is connected to a neon voltage regulating tube 185 having its other terminal grounded. The plate of the pentode 155 is connected through its plate load resistor 186 to the power supply terminal 63 and advantageously is coupled to ground through a fairly large condenser 190, which reduces the frequency response and stabilizes the control amplifier 36 so that it is essentially a direct current amplifier.

The cathode 192 of the triode is biased to the proper operating range by a third voltage-dropping network including resistors 194 and 196 connected between the power supply terminal 63 and ground, with the cathode 192 being connected to their junction. Preferably, the resistors 194 and 196 are made as small as operation will permit in order to secure more gain in the control amplifier 36.

For further explanation of the operation of the station-selecting circuit, assume that the contact 153 has been at a position along the potentiometer 144 corresponding to a radio station to which the automobile driver has been listening. The driver, wishing to listen to another station on a higher frequency moves the contact 153 counterclockwise along the potentiometer 144. This feeds a negative voltage to the grid 154 of the pentode 155. The voltage of its plate 156 increases and biases the grid 158 more positive so that an increased current flows through the triode 160 and through the control winding 37. This increase in control current increases the saturation of the three cores 40, 42 and 44 and reduces the inductance in circuits A, B, and C, and hence raises the frequency to which the receiver 10 is tuned.

This increase in frequency immediately causes the discriminating and rectifying circuit 35 to shift the voltage of both of the terminals 133 and 135 in the positive direction causing the new point on potentiometer 144 to which the contact 153 has been moved to shift up toward zero voltage with respect to the common ground circuit. The voltage fed to the grid 154 moves back toward zero, preventing any further current change through the control winding 37 and thus holding the receiver 10 tuned to the new frequency corresponding to the new position of the contact 153.

When the contact 153 is moved clockwise along the potentiometer 144, the operation of the control circuit is the opposite of that described above, and the receiver 10 is tuned to a lower frequency.

Among the important advantages of the remote station selecting control circuits described, is that the frequency of the oscillator stage 28 is continually sensed or measured by the discriminator and rectifier circuit 35. Any changes in the oscillator frequency for any reason, cause a different signal to be fed to the grid 154 of the D.C. amplifier stage 36, thus changing the current through the control winding means 37 to bring the oscillator frequency back to the desired frequency. In effect, the operation of the remote tuning circuits is dependent only upon the values of the three elements in the discriminator circuit, that is, upon the resistor 122, inductor 124 and condenser 126. These three elements are arranged to be substantially insensitive to changes in temperature, and hence the operation of the remote tuning circuits as a whole is made independent of temperature changes. Moreover, the station selecting circuits are made substantially independent of any tendency toward hysteresis effect in the controlled inductance values in circuits A, B, and C, for as mentioned above a given position on any one of the control potentiometers 144, 144a, or 144b corresponds to a given frequency of the oscillator 28. Thus, regardless of from which direction the tuning knob 16 is tuned toward a given position on one of these potentiometers, as it reaches that position the operation of circuits 35 and 36 forces the inductance in circuits A, B, and C to change to the proper value to tune the receiver to the frequency corresponding with that position on the dial 16. The magnitude of the control current automatically adjusts itself to overcome any tendency toward magnetic hysteresis in the control flux.

The operation of the automatic station selecting circuit 38 is similar to that of the manual circuit just described, the position of the movable contact 153b along the potentiometer 144b being controlled by a unidirectional motor 200 connected between the power supply terminal 63 and the plate 202 of a pentode 203. When the listener wishes to cause the automatic selector to tune the receiver 10 to the next station, he depresses one of the switches 22 or 23, discharging a condenser 204 connected to the grid 205 of the pentode 203 to drop this grid to ground potential. A large current then flows from the power supply through the motor 200 and the tube 203 to ground. This causes the motor 200 to turn and move the contact 153b counterclockwise along the potentiometer 144b. As soon as the receiver is tuned to the next station having a carrier of sufficient strength at antenna 12 for proper reception, an automatic control voltage is fed through a resistor 206 to bias the grid 205 to a cut-off voltage, stopping the current through the motor 200. The potentiometer 144b is arranged in a substantially complete circle so that as the listener tunes from station to station the contact 153b moves counterclockwise toward the terminal 150b. As soon as the contact 153b has passed the position on the potentiometer corresponding to the last station near the top of the broadcast band having a sufficiently strong carrier signal for proper reception, the contact 153b jumps from terminal 150b over to terminal 152b and begins around potentiometer 144b again. Thus, in operation, the automatic station selector starts at the bottom of the broadcast band and moves up to the top then jumps to the bottom and progresses toward the top again. The screen 207 of the tube 203 is connected to a grounded condenser 210 and to the junction of a pair of resistors 208 and 209 in a voltage dropping network connected between the power supply terminal 63 and a cathode resistor 212, which also provides fixed bias for the cathode 214.

To provide the maximum sensitivity of control in order to hold the receiver 10 closely tuned to any desired station, the oscillator 28 is preferably operated at substantially the full amplitude permitted by the rating of the tube 90 used.

Among the advantages of the circuit described are that they provided remote control of the receiver; that they eliminate all moving parts; and that they provide a receiver of longer life and one which is more rugged in operation because of the elimination of the moving parts. Moreover, for reasons which are not fully understood the receiver circuit described actually operates in a manner considerably superior to that of the ordinary heterodyne receiver having the same number of tubes in the radio portion of the receiver. This receiver as disclosed has better than a microvolt of sensitivity, that is, a microvolt impressed on the antenna 12 produces a signal in the loud speaker 14 which is at least twice as loud as the background noise. One of the possible explanations for the superiority of the receiver disclosed is that the inductance to capacitance ratio of the tuned plate circuit in the R.F. amplifier is considerably lower than is customary in standard superheterodyne sets. This advantageously enables the use of a pentode 90 which has a much larger transconductance than is usually possible in an ordinary superheterodyne receiver.

Moreover, there are certain important fundamental differences in the operation of a receiver wherein the condenser values are fixed and the inductance values are changed from the operation of an ordinary receiver in which the inductance values are fixed and the condensers are changed in value. Some of these differences are not at all apparent and are rather surprising in their results, as will be pointed out in the following description. In the ordinary superheterodyne receiver in order to increase the frequency, the capacitance is decreased while the inductance remains constant. Thus, as the frequency is increased, the impedance of the resonant circuits involved is increased due to the fixed inductances involved. The increase in impedance tends to cause regeneration problems. Moreover, it decreases the effective gain at the higher frequencies because of the presence of shunt or stray capacities to ground which are present in any circuit. Also, the losses in the fixed inductances increase, so that the "Q" drops and, thus, the band-width value decreases.

In contrast to this, in the present circuit with increasing frequency the effective impedance of the tuned circuits actually decreases. In addition, due to the decrease in inductance (which also means a decrease in the resistance losses in the inductance) there is a corresponding increase in the "Q" of the circuits being used. The result is that the effective band-width of the receiver is constant over the full range of reception, and moreover the effective gain of the receiver is constant because the impedance does not rise with increasing frequency.

The reason that the band-width is constant is that it is proportional to the ratio of the frequency and Q. That is: $BW \alpha F/Q$. As the frequency rises the Q is correspondingly increased so that the ratio remains approximately constant, and hence the band-width is approximately constant throughout the full range of operation of the receiver.

Another advantage of the present invention is that it is not the absolute values of the inductances which are important in the operation, but rather their normalized values, that is, the ratio of the incremental inductance at any point to the incremental inductance when the control current is zero. This is particularly helpful in the antenna circuit because it enables the use of a wide variety of antennas, the only requirement being that the total volume and shape of the antenna loop winding 73 be maintained the same. Thus, any configuration of antenna may be used and will produce results superior to those in the ordinary receivers used today.

Although the present receiver is described as tunable over a range from 530 to 1650 kc., the inductance values of the control circuits A, B, and C are capable of variations over ranges of 100 to 1 or even 200 to 1. Thus, it is apparent that the method of the present invention is capable of use for tuning a receiver over a far wider range than is done today with mechanically variable condensers.

In Figures 8 and 9 another embodiment of a variable inductor 240 is shown. This variable inductor 240 may be used with two other similar controllable inductors (not shown) to provide the control circuits A, B, and C in receiver 10. The controllable inductor 240 has a control winding 37a which in operation is connected between the leads 162 and 87 in series with the corresponding control windings (not shown) of the other two similar controllable inductors, mentioned above, as will be understood. This inductor 240 includes a signal core portion 42a carrying a winding 48a similar to the core 42 and winding 48 in the control circuit B. Core 42a is bridged across between a pair of copper shims 60a resting against the side legs 242-1 and 242-2 of a control core portion 52a. The control winding 37a is wound on the back part of the core 52a. The core 52a is made of a flexible magnetizable material, for example a strap of soft iron bent into a U shape to form the two side legs 242 and 243, with the ends of the side legs being bent over again toward one another in a spaced overlapping relationship to form a magnetic path for the control flux between legs 242 and 243 in shunt with the path through the core 42a. An adjustment of the effective reluctance of this shunt path is provided by a large-headed machine screw 244 of non-magnetic material threaded through a hole in the outer end of the leg 242 and resting against the inner end of the leg 243. By tightening it, this shunt reluctance is increased, so that for any given value of the current in the control winding 37a the degree of magnetic saturation of the signal core portion 42a is increased lowering the effective inductance of the winding 48a thereon. In overall effect tightening the screw 244 is equivalent to adding some turns in the winding 37a.

When the three inductors similar to inductor 240 have their control windings connected in series there may be deviations of the controlled inductance values in circuits A, B, and C from one another, so that due to individual differences they do not "track" properly. The shunt control flux path adjustment by the screw 244 enables compensations to be made for the individual deviations so that the inductance values are caused to "track" one another.

Another adjustment for tracking characteristics is provided by changing the reluctance in series with the control flux path through the core 42a with a non-magnetic machine screw 248 which serves to skew the right shim 60a to change the effective length of the reluctance region between the right end of the core 42a and the leg 243. To facilitate the tilting of this shim, the end of the screw may be rounded to fit it a socket in the shim. By adjusting the screws 244 and 248 all of the controllable inductors 240 used can be adjusted to "track" one another as desired.

Among the advantages of using separate controllable inductors instead of having them ganged upon a single control yoke 42 is that each of them may then be located closely adjacent the portion of the receiver circuit desired, thus advantageously enabling the use of shorter interconnecting wires within the receiver.

*Remote control circuits and interconnections*

All of the connections to the receiver chassis 10 are made through three sockets: an antenna lead-in socket 250 (Figure 1), a loudspeaker outlet 252, and a control and power socket 254. The antenna is mounted on the automobile near the receiver chassis 10; for example, it may be fastened on the rear bumper or on the rear of the car near the top of the trunk, as shown in Figure 1, with its lead-in wire adapted to be plugged into the socket 250. The loudspeaker 14 is located remotely from the chassis 10; for example, under a grill in the rear window ledge with its leads 256 plugged into the socket 252.

A seven-wire control and power cable 260 extends between a plug 261 in the receiver socket 254 and a socket 262 adjacent the steering post 24 and the floorboards.

To permit control of the radio from the rear seat, a branch cable 264 extends from the cable 260 to a socket 266, secured to the back of the front seat, so that an extension control unitl 268 can be plugged into it when desired.

Also, a socket 270 may be provided under the floorboards near the driver's position into which is plugged a lead from the automatic station changing foot switch 23.

The power for the receiver is supplied yb the automobile battery 65 through a lead 272 and the ignition switch 274 to the socket 262. The leads from the controls on the steering when pass down inside of the steering column 24 some going directly to a plug 280 adapted to connect with the socket 262; others are connected through the switch 141 to the plug 280. The switch 141 is located adjacent the plug 280 where the driver can operate it with his foot. It switches the connections to permit the radio to be operated by the controls on the steering column or by the extension control unit 268.

When the switch 141 is in its left-hand position, as viewed in Figure 4, it connects the steering wheel controls to the receiver, and when it is in its other position, it connects the receiver to the extension control unit 268 through an instrument panel socket 282. With the switch 14 in one position, all of the steering-wheel controls except the on-off switch are disconnected from the system, and the extension unit 268 base plug 269 which can be plugged into either socket 282 or 266 to enable either the person next to the driver or one in the rear seat to operate the receiver when it is turned on.

Assuming that the ignition switch is on and that the switch 141 is in the left position so that the steering wheel controls are operative, the driver turns the receiver on by closing an on-off switch 283 ganged to a volume control potentiometer contact 284. From the socket 262, the current for the receiver is supplied through the plug 280, a lead 285, the on-off switch 283, a lead 286, the control switch 141, a lead 288, the plug 280 and the socket 262, and a lead 288 in the cable 260 to the plug 261. The socket 254 (Figure 3), which receives the plug 261, provides a continuation of the lead 288 through the solenoid of a stepping relay 290 to the power supply 62. The lead 288 is arranged by connection X also to supply the heater circuits of the vacuum tubes in the radio. These circuits are conventional and have been omitted from the drawings.

The volume control potentiometer has one end connected to the common "ground" return circuit of the automobile. Its other end is connected through a lead 296 and the switch 141, a lead 298 in the cable 260, the plug 261, the socket 254 (Figure 3), and the continuation of the lead 298 in the radio chassis to a coupling condenser 300 at the output of the first audio amplifier stage 38. The slidable contact 284 of the potentiometer is connected through a tone-control potentiometer 304, the slidable contact of which is coupled through a capacitor 305 to ground, then through a lead 306, the switch 141, and a lead 308, through the plug cable connections described above and through the lead 308 in the chassis 10 (Figure 3) to the control grid 309 of a pentode vacuum tube in the audio power amplifier stage 34.

In order to change the receiver from manual control to automatic control, the stepping relay 290 is actuated merely by turning the power off and on. The stepping relay 290 moves a double-pole double-throw switch 140 between its upper or "automatic carrier-seeking control" position and its lower or "manual control" position. Turning the power off and on again returns the receiver to manual control.

Assuming that switch 140 is in its manual control position, then the manual station selector 16 and potentiometer 144 (Figure 4) controls the frequency to which the receiver is tuned, as explained above. The circuit from the output terminal 135 through the potentiometer 144 and back to the output terminal 133 can be followed through the switch 140, a lead 320, the cable and switch connections already described, and a lead 122 to the potentiometer terminal 152. The circuit from the other terminal 150 of the potentiometer 144 is returned through a lead 324, which bypasses the switch 141 and a lead 326 through the cable connections to the output terminal 133 of the discriminating and detecting circuit 35. The movable contact 153 of the potentiometer 144 controls the voltage applied to the input grid 154 (Figure 3) of the direct current amplifier 36. This circuit can be traced from the potentiometer contact 153 through a lead 332, the switch 141 and a lead 334 through the cable connections to the switch 140 and from the switch 140 through a lead 336 to the control grid 154.

In addition to the foot button 23 (Figure 4) the driver is provided with the switch 22 on the steering wheel which may be used when the receiver is adjusted for automatic carrier-seeking operation. Switch 22 is connected to the same lead 337 in the cable 260 as is the foot switch 23, the connection being made by means of a lead 340, and the switch 141.

When the switch 140 (Figure 3) is in its upper automatic carrier-seeking control position, the driver may depress either switch 22 on the steering wheel or the foot switch 23 to cause the receiver to "jump" from the station to which it is tuned to the next station having a signal at antenna 12 of sufficient intensity for proper reception, the selection of the stations being controlled by the circuit 38, as already explained.

Looking at the right side of Figure 4, it is seen that the extension control 268 includes duplicates of the controls that are provided for the driver, with the exception of a foot switch. The various components of extension unit 268 performing functions similar to the driver's controls have similar reference numerals followed by the suffix "a." When the plug 269 is removed from the instrument panel socket 282 and plugged into the rear seat socket 266, as indicated in phantom lines, the passengers in the rear of the car have full remote control of the receiver, except that the on-off switch 282a has no control over the receiver because there is no socket lead for plug 266 corresponding to the top prong of the plug 269, the driver thus being able to turn the receiver on or off by the switch 282.

*Circuit parameters, circuit details and calculations*

In a particular embodiment of the present invention the connections from the oscillator stage through the remainder of the radio circuit are as follows:

The output from the plate 342 of the oscillator converter tube 90 is fed to the first I.F. transformer 346 having its primary and secondary windings 347 and 348, respectively, shunted by condensers 350 and 351 connected to ground through a condenser 352. The I.F. signal from the secondary 348 is fed to the grid 353 of a pentode 354 having a cathode 355 connected to ground through a resistor 356. The output from the plate 358 of the tube 354 is fed through a second I.F. transformer 346a, including components similar to those of the first I.F. transformer, to the cathode 360 of a detector tube 362. The rectified signal appearing at the plate 364 of the tube 362 is filtered by a pi-filter formed by a pair of condensers 365 and 366 shunted to ground with a series filter resistor 368 connected therebetween. The audio signal appearing across a resistor 372 in parallel with the condenser 366, is coupled through condenser 374 across a grid return resistor 375 to the grid 376 of a triode 377 having its cathode 378 grounded and its plate 380 connected to the condenser 300 and also connected through a load resistor 382 to the power supply terminal 63. A small condenser 384 across the load 382 provides filtering and proper tone balance.

The voltage from the detector plate 364 is also used as an automatic volume control voltage and is fed from the resistor 206 through another filter resistor 365 and across a filter condenser 366 and through an isolating resistor 368 to the grid 353 of the first I.F. amplifier tube 354 to control its gain and through a resistor 400 to the grid of the R.F. amplifier tube 75 to control its gain.

As described above, the audio signals from the audio stage 33 pass through the volume and tone control circuits and then back to the grid 309 of the pentode 310 whose cathode 402 is connected to ground through a cathode bias resistor 404 shunted by a condenser 406 and with its plate 408 connected through the primary 410 of a loudspeaker matching transformer 412, whose secondary 414 is connected through the plug 252 and the leads 256 to the loud speaker 14.

In this embodiment the following values were used for the components and circuit parameters as listed.

Tubes:
| | |
|---|---|
| 75 | 6AH6 |
| 90 | 6BE6 |
| 155 | 6U8 |
| 185 | NE-2 |
| 310 | 6N6 |
| 354 | 6BA6 |
| 362 and 377 | 12AT7 |

Resistors:
| | Ohms |
|---|---|
| 86 | 1,000 |
| 89 | 120,000 |
| 101 | 22,000 |
| 114 | 1,000 |
| 122 | 10,000 |
| 130 | 300,000 |
| 144 | 100,000 |
| 151 | 6,200 |
| 157 | 68,000 |
| 168 | 100,000 |
| 170 | 47,000 |
| 172 | 1,000 |
| 180 | 47,000 |
| 182 | 75,000 |
| 184 | 36,000 |
| 186 | 1,000,000 |
| 194 | 10,000, 2 watt |
| 196 | 18,000 |
| 356 | 100 |
| 368 | 470,000 |
| 400 | 470,000 |

Condensers:
| | In Microfarads |
|---|---|
| 78 | Variable 7 to $45 \times 10^{-6}$ |
| 81 | .01 |
| 85 | Variable 7 to $45 \times 10^{-6}$ |
| 88 | .01 |
| 99 | $33 \times 10^{-6}$ |
| 112 | .01 |
| 126 | $10 \times 10^{-6}$ |
| 132 | .01 |
| 136 | .01 |
| 139 | .01 |
| 177 | $100 \times 10^{-6}$ |
| 190 | 2 |
| 352 | .01 |
| 369 | .01 |

In order to obtain proper "tracking" of the frequency of the oscillator circuit with respect to the tuned frequency of the R.F. amplifier the values of the condensers and inductances used in the oscillator tank circuit and in the tuned input and output circuits of the R.F. amplifier were calculated as follows:

Assume that the receiver range is 530 to 1650 kc. with an intermediate frequency of 455 kc. Thus, the range of the oscillator 28 is 985 to 2105 kc.

The circuit values are calculated to provide alignment at three tracking points, as follows:

| Receiver Frequency | Oscillator Frequency |
|---|---|
| The three tracking points $f_1$, $f_2$, and $f_3$ for the receiver are chosen: | The three tracking points $F_1$, $F_2$, and $F_3$ for the oscillator are chosen: |
| $f_1=f_1=600$ kc. | $F_1=F_1=1,055$ kc. |
| $=f_p=960$ kc. | $=F_2=1,415$ kc. |
| $=f_3=1,500$ kc. | $=F_3=1,955$ kc. |

| Form of Receiver Tuned Circuit | Form of Oscillator Tank Circuit |
|---|---|
| Where L is the variable shunt inductance and $C_1$ is the fixed shunt capacitance in the parallel resonant circuit. 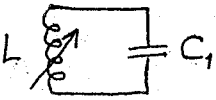 In the following calculation $X_1 = X_1$, $X_2$, and $X_3$ are the respective reactance values of $C_1$ at the three receiver tracking point frequencies: $\frac{1}{4\pi^2 X_1} = f_1^2 C_1$ $\frac{1}{4\pi^2 X_1} = 14.40$ $\frac{1}{4\pi^2 X_2} = 36.864$ $\frac{1}{4\pi^2 X_3} = 90.00$ $4\pi^2 X_1 = .069444$ $4\pi^2 X_2 = .027127$ $4\pi^2 X_3 = .011111$ $4\pi^2(X_1 - X_2) = 4.2317 \times 10^{-2}$ $4\pi^2(X_2 - X_3) = 1.6016 \times 10^{-2}$ | Where L is the inductance value of the variable element 48; $L_s$ is the value of the fixed series padding inductance element 95 to be calculated; $L_p$ is the value of the fixed padding inductance element effectively in parallel with L and $L_s$, to be calculated; and $C_2$ is the effective value of the capacitance shunted across $L_p$, to be calculated. 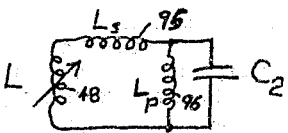 In the following calculation $Y_1 = Y_1$, $Y_2$, and $Y_3$ are the respective admittance values of $C_2$ at the three oscillator tracking point frequencies: $\frac{Y_1}{4\pi^2} = F_1^2 C_2$ $\frac{Y_1}{4\pi^2} = 44.521$ $\frac{Y_2}{4\pi^2} = 80.089$ $\frac{Y_3}{4\pi^2} = 152.88$ $X_1 = .0017590 = 1.7590 \times 10^{-3}$ $Y_1 = 1,757.7 = 1.7577 \times 10^3$ $\frac{1}{4\pi^2}(Y_1 - Y_2) = -3.5568 \times 10$ $\frac{1}{4\pi^2}(Y_2 - Y_3) = -7.279 \times 10$ |

$$A_{12} \stackrel{\Delta}{=} X_1 Y_1 - X_2 Y_2 = 0.9192$$

$$A_{23} \stackrel{\Delta}{=} X_2 Y_2 - X_3 Y_3 = 0.4740$$

Now evaluating three determinants:

$$D_X = \frac{1}{4\pi^2} \begin{vmatrix} A_{12} & 4\pi^2(X_1 - X_2) \\ A_{23} & 4\pi^2(X_2 - X_3) \end{vmatrix} = \frac{1}{4\pi^2} \begin{vmatrix} 0.9192 & 4.2317 \times 10^{-2} \\ 0.4740 & 1.6016 \times 10^{-2} \end{vmatrix}$$

$$= \frac{1}{4\pi^2}(-5.336 \times 10^{-3}) = -1.352 \times 10^{-4}$$

$$D_Y = 4\pi^2 \begin{vmatrix} \frac{1}{4\pi^2}(Y_1 - Y_2) & A_{12} \\ \frac{1}{4\pi^2}(Y_2 - Y_3) & A_{23} \end{vmatrix} = 4\pi^2 \begin{vmatrix} -3.5568 \times 10 & 0.9192 \\ -7.279 \times 10 & 0.4740 \end{vmatrix}$$

$$= 4\pi^2(50.050) = 1.9760 \times 10^3$$

$$D = \begin{vmatrix} \frac{1}{4\pi^2}(Y_1 - Y_2) & 4\pi^2(X_1 - X_2) \\ \frac{1}{4\pi^2}(Y_2 - Y_3) & 4\pi^2(X_2 - X_3) \end{vmatrix}$$

$$= \begin{vmatrix} -3.5568 \times 10 & 4.2317 \times 10^{-2} \\ -7.2970 \times 10 & 1.6016 \times 10^{-2} \end{vmatrix} = 2.5106$$

$$X_o = \frac{D_X}{D} = \frac{-1.352 \times 10^{-4}}{2.5106} = -5.385 \times 10^{-5}$$

$$Y_o = \frac{D_Y}{D} = \frac{1.9760 \times 10^3}{2.5106} = 787.06$$

$$K = (X_1 - X_o)(Y_1 - Y_o) = (1.7590 \times 10^{-3} - .0538 \times 10^{-3})(1.7577 \times 10^3 - .7871 \times 10^3) = 1.6551$$

$$L_s = -X_o = 5.385 \times 10^{-5} = 53.8 \text{ microhenries}$$

$$L_p = \frac{K}{Y_o} = \frac{1.6551}{787.06} = 2.1029 \times 10^{-3} = 2.10 \text{ millihenries}$$

$$C_2 = \frac{C_1}{K} = \frac{40 \text{ pf.}}{1.6551} = 24.16 \text{ pf. (micromicrofarads)}$$

From the foregoing description it will be understood that the present invention provides an automobile radio receiver system having many advantages as discussed above, and it is understood that the system described can be adapted to a wide variety of different applications and that various changes or modifications may be made therein, each as may be best suited to the particular application desired and that the scope of the present invention is intended to include such modifications or adaptations, as defined by the following claims limited only by the prior art.

What is claimed is:

1. A remotely-controllable automobile radio reciever assembly comprising a radio receiver and control means remote therefrom located adjacent the driver's location, said control means including an on-off switch for turning the radio receiver on and off, a station-selection control for selecting the radio station to which said radio receiver is to be tuned, and a volume control, a loud speaker connected to said radio receiver, said radio receiver comprising a chassis including a frequency-determining circuit for determining the frequency to which the said receiver is tuned, an inductance tuning element in said frequency-determining circuit, control winding means associated with said inductance tuning element for varying its inductance in accordance with the current in said control winding, a frequency-responsive control circuit directly coupled to said frequency-determining circuit for sensing directly the frequency to which said frequency-determining circuit is tuned, and being responsive to said frequency to control the current through said control winding, said station-selection control being coupled to said frequency-responsive control circuit and adjusting the frequency-response characteristics thereof for tuning said receiver, and electrical connection means between said on-off switch, station-selection control, volume control, and radio chassis.

2. A remotely controllable automobile radio receiver assembly comprising a radio receiver and control means remote therefrom located adjacent the driver's location, said control means including an on-off switch for turning the radio receiver on and off, a station-selection control for selecting the radio station to which said receiver is to be tuned, and a volume control, a loud speaker connected to said radio receiver, said radio receiver comprising a chassis including a frequency-determining circuit for determining the frequency to which the said receiver is tuned, an inductance tuning element in said frequency-determining circuit, control winding means associated with said inductance tuning element, a source of current connected to said control winding means for varying the inductance of said inductance tuning element in accordance with the current supplied by said source to said control winding, a frequency-responsive regulating circuit coupled to said source of current for controlling the amount of current supplied by said source to said control winding means, said frequency-responsive regulating circuit being directly coupled to said frequency-determining circuit for sensing directly the frequency to which said frequency-determining circuit is tuned, said frequency-responsive regulating circuit being responsive to the frequency determined by said frequency-determining circuit to regulate the current from said source to said control winding, said station-selection control being connected to said frequency-responsive regulating circuit and adjusting the frequency response characteristics thereof for tuning said receiver, and electrical connection means between said on-off switch, station-selection control, volume control, and radio receiver.

3. An automobile radio receiver assembly comprising control means adjacent the driver's location including an on-off switch, a station selection control, and a volume control, a radio receiver located remotely from said control means and including a station-selecting circuit having a variable frequency oscillator, an electrically-controllable inductance element in said oscillator circuit for controlling the frequency of said oscillator circuit, regulating means including frequency-responsive means coupled to said oscillator, said regulating means being directly responsive to the frequency of the oscillator for varying the effective inductance of said electrically-controllable inductance element, and electrical connection means between said control means adjacent to the driver's location and the receiver, said connection means including circuit means coupling said station-selecting control to said regulating means for varying the frequency-response characteristics thereof, thereby tuning the receiver.

4. An automobile radio receiver arrangement comprising control means adjacent the driver's location including an on-off switch, a volume control, and variable resistor means, a radio receiver located remotely from said control means and including a frequency tuning circuit, an electrically controllable inductance tuning element having a signal winding in said frequency tuning circuit and having a control winding for regulating the inductance of said signal winding, a controllable frequency-responsive control circuit coupled to said inductance tuning element and controlled directly by said inductance tuning element, current supply means under the control of said frequency-responsive control circuit and being connected to said control winding to regulate the inductance of said signal winding, and electrical connection means coupling said variable resistor means into said controllable frequency-responsive control circuit, for varying the control characteristics of said control circuit and circuit means connecting said on-off switch and said volume control to said receiver.

5. An automobile radio receiver arrangement comprising control means adjacent the driver's location including an on-off switch, a station selection control, a volume control, a radio receiver located remotely from said control means and including a radio frequency tuning circuit and a variable frequency oscillator circuit, a plurality of electrically-controllable frequency tuning elements, one of said tuning elements being in said radio frequency tuning circuit and another in said oscillator circuit, regulating means for varying the tuning frequency of said tuning elements, said regulating means including a frequency-discriminator circuit connected directly to said oscillator circuit and directly responsive to the frequency of said oscillator circuit, and electrical connection means between said station selection control and said regulating means, and between said on-off switch and volume control and said radio receiver.

6. A radio receiver control arrangement comprising control means, a radio receiver located remotely from said control means and including a radio frequency tuning circuit and a variable frequency oscillator circuit, controllable inductor means having a plurality of signal circuits, ferrite core portions associated with each of said signal circuits, and electromagnetic means coupled to said ferrite core portions for controlling the saturation of all of said ferrite core portions, one of said signal circuits being included in said radio frequency tuning circuit and another in said oscillator circuit, a control circuit including frequency responsive means directly coupled to said oscillator circuit and sensing the actual frequency thereof, said control circuit including means predetermining the desired frequency to which said oscillator circuit is to be tuned, said control circuit being coupled to said electromagnetic means for minimizing the difference between said actual and desired frequencies, and connection means between said control means and said desired frequency predetermining means.

7. A radio receiver control arrangement comprising control means, a radio receiver having a radio frequency tuning circuit and a variable frequency oscillator circuit, controllable inductor means having a plurality of signal circuits, a plurality of similar ferrite core portions each associated with one of said signal circuits, electromagnetic means coupled to said ferrite core portions and adapted to carry current for regulating the saturation of all of said ferrite core portions to control the inductance of said signal circuits, one of said signal circuits being included in said radio frequency tuning circuit and another in said oscillator circuit, the ratios of the changes in the inductance values in all of said signal circuits being substantially the same for any change in current in said electromagnetic means, a control circuit including frequency-responsive means coupled directly to said oscillator circuit and responsive directly to the frequency of said oscillator circuit, a controllable current source connected to said electromagnetic means said control circuit being connected to said controllable current source for controlling the current to said electromagnetic means in accordance with the frequency of said oscillator circuit, and connection means between said control means and said control circuit.

8. An automatically tunable radio receiver including a radio frequency amplifier stage, an oscillator stage connected thereto and amplifier and detector stages coupled to said oscillator stage, variable inductance means in said receiver including at least two signal windings, control winding means for said inductance means, first circuit means connecting one of said signal windings in said radio frequency amplifier and second circuit means connecting the other of said signal windings in said oscillator stage, control means including a frequency-responsive circuit coupled directly to said oscillator stage and directly responsive to the frequency of said oscillator stage for regulating the inductance of said signal windings in accordance with the sensed value of oscillator frequency, said control means including a controllable source of current connected to said control winding means, motor means coupled to said control means and arranged to change the current from said source of current through said control winding means when said motor means is actuated, third circuit means connected between said detector and said motor means to actuate said motor means, and a manually-operable control connected to said third circuit means.

9. An automobile radio receiver assembly as claimed in claim 3 and wherein said circuit means couple said station-selecting control to said frequency responsive means.

10. A remotely-controllable automobile radio receiver system comprising a radio receiver circuit having a common return circuit and control means remote therefrom and located adjacent to the driver's location, said control means including an on-off switch for turning the radio receiver on and off, a station selection control potentiometer having an adjustable contact, and a volume control, a loudspeaker connected to said radio receiver, said radio receiver including an oscillator circuit, a first rectifier and a first capacitor connected to said oscillator and generating a first voltage across said capacitor, a frequency discriminator circuit connected to said oscillator, a second rectifier and capacitor connected to said frequency discriminator circuit and generating a second voltage across said second capacitor as a function of oscillator frequency, said second capacitor being connected between one side of said first capacitor and the common return circuit, said second voltage being of opposite polarity from said first voltage, a controllable inductance having a control winding and a signal winding included in said oscillator circuit for controlling the frequency thereof, a controllable source of current connected to said control winding, first connection means connecting said station-selecting potentiometer across said first capacitor and connecting the adjustable contact to said controllable source of current, and second connection means connecting said volume control to the radio receiver for regulating the volume from the loudspeaker.

References Cited in the file of this patent

UNITED STATES PATENTS

| | | |
|---|---|---|
| 1,918,683 | Aull | July 18, 1933 |
| 2,068,320 | Grant | Jan. 19, 1937 |
| 2,159,754 | Wohlfarth | May 23, 1939 |
| 2,206,512 | Reinholz et al. | July 2, 1940 |
| 2,255,915 | De Kramolin | Sept. 16, 1941 |
| 2,288,120 | Challis | June 30, 1942 |
| 2,302,893 | Van Roberts | Nov. 24, 1942 |
| 2,326,737 | Andrews | Aug. 17, 1943 |
| 2,462,423 | Polydoroff | Feb. 22, 1949 |
| 2,491,968 | Gilbert | Dec. 20, 1949 |
| 2,581,202 | Post | Jan. 1, 1952 |
| 2,611,094 | Rex | Sept. 16, 1952 |
| 2,755,446 | Gabor | July 17, 1956 |
| 2,774,872 | Howson | Dec. 18, 1956 |
| 2,811,639 | Sontheimer | Oct. 29, 1957 |

FOREIGN PATENTS

| | | |
|---|---|---|
| 840,140 | France | Jan. 11, 1939 |

OTHER REFERENCES

"Tuning With a Rheostat," article by Leithaüser et al. in Radio Craft, July 1939, pages 13, 51.

"Magnetic Tuning Devices," article by De Kramolin in Wireless World, March 3, 1938, pages 186 to 188.